(12) United States Patent
Somatomo

(10) Patent No.: US 7,732,090 B2
(45) Date of Patent: Jun. 8, 2010

(54) SEALED RECTANGULAR BATTERY

(75) Inventor: Yoshiki Somatomo, Kyoto (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 1247 days.

(21) Appl. No.: 10/951,774

(22) Filed: Sep. 29, 2004

(65) Prior Publication Data

US 2005/0069760 A1    Mar. 31, 2005

(30) Foreign Application Priority Data

Sep. 30, 2003    (JP) .............................. 2003-339360

(51) Int. Cl.
*H01M 2/12* (2006.01)
*B65D 90/36* (2006.01)

(52) U.S. Cl. ........................... 429/82; 429/56; 220/89.2

(58) Field of Classification Search ....................... None
See application file for complete search history.

(56) References Cited

U.S. PATENT DOCUMENTS 5,609,972 A * 3/1997 Kaschmitter et al. .......... 429/56

FOREIGN PATENT DOCUMENTS

| JP | 10-261391 A | 9/1998 |
|---|---|---|
| JP | 10261391 A * | 9/1998 |
| JP | 11-185714 A | 7/1999 |
| JP | 2001-143664 A | 5/2001 |
| JP | 2001-256944 A | 9/2001 |
| JP | 2001256944 A * | 9/2001 |
| KR | 2000-0014824 | 3/2000 |

* cited by examiner

*Primary Examiner*—Keith Walker
(74) *Attorney, Agent, or Firm*—Birch, Stewart, Kolasch & Birch, LLP

(57) ABSTRACT

A sealed rectangular battery having a reliably operative explosion-proof valve is provided. A rectangular battery case 1 whose cross-section is oblong, the battery case having a prismatic shaped case body 5 with a bottom and a lid 6. An explosion-proof valve 2 is arranged near one of two opposing short sides of a main surface wall of the lid. The explosion-proof valve a V-cut groove 15 concavely formed in V-shaped or U-shaped in which a central bent part 15a is positioned at a central location in the main surface wall 6a of the lid, and a thin wall 16 formed by the V-cut groove. Cut grooves 18 connecting each of two ends of the V-cut groove and each of two long sides of the main surface wall of the lid which are parallel to each other, respectively, are cut and formed in the main surface wall of the lid.

3 Claims, 6 Drawing Sheets

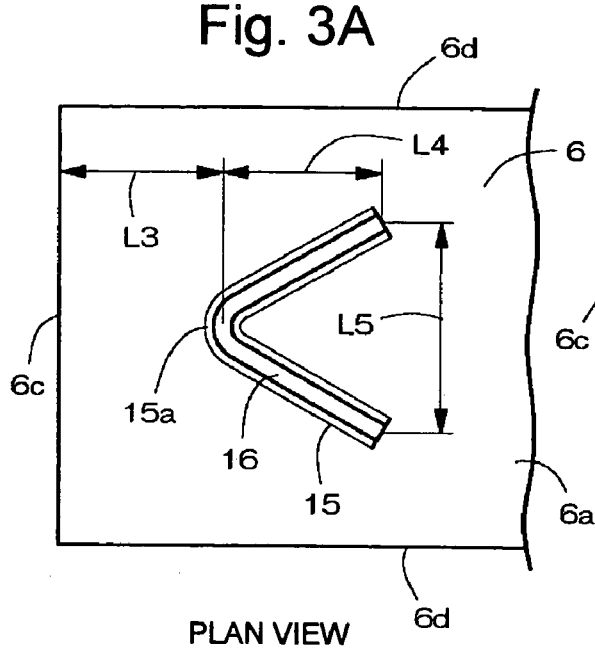
Fig. 3A PLAN VIEW
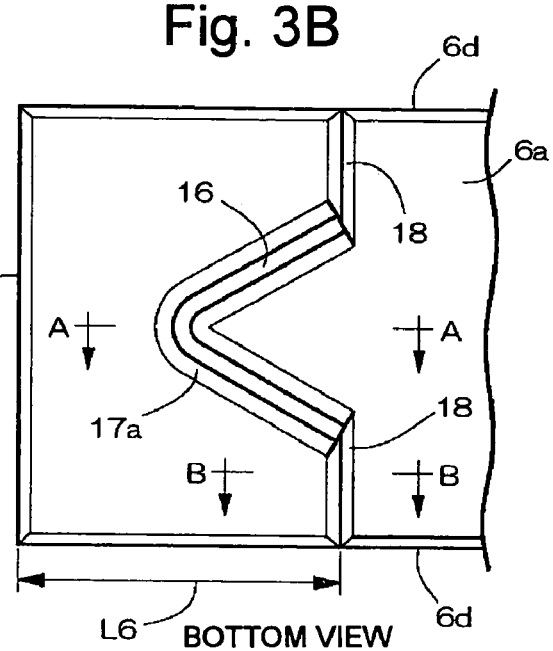
Fig. 3B BOTTOM VIEW
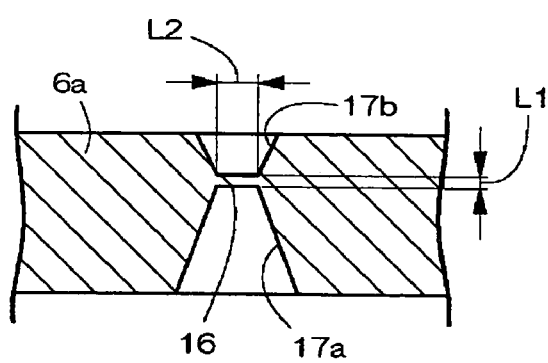
Fig. 3C CROSS SECTIONAL VIEW TAKEN ALONG A-A LINE
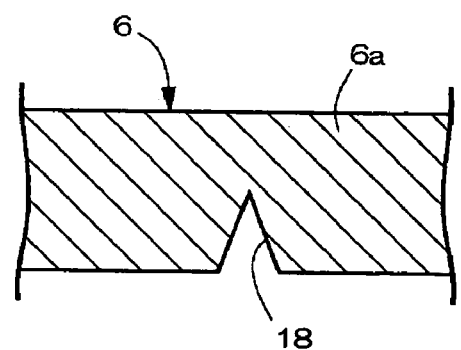
Fig. 3D CROSS SECTIONAL VIEW TAKEN ALONG B-B LINE

SEALED RECTANGULAR BATTERY

This Non-provisional application claims priority under 35 U.S.C. § 119(a) on Patent Application No(s). 2003-339360 filed in Japan on Sep. 30, 2003.

BACKGROUND OF THE INVENTION

1. Field of the Invention

The present invention relates to a sealed rectangular battery including an explosion-proof valve in a square shaped battery case.

2. Description of the Related Art

Recently, compact and light electronic apparatuses such as portable phones or personal digital assistances are becoming widespread. A compact and light battery having high-capacity is being used as a power source. As the electronic apparatus is becoming more sophisticated, the battery is being required to have higher capacity. Particularly, a primary battery using lithium metal as an active material, and a secondary battery for performing charge and discharge using lithium ion is being widely used because of its light weight and high-capacity, and a development in higher capacity thereof is also active.

In such battery, when an excessive electrical load is applied or an excessive thermal load is applied, a short-circuit state occurs within the battery thus generating gas, and an internal pressure of the battery rises abnormally. Even when the battery is over charged, gas is generated within the battery due to decomposition of an electrolytic solution, and the internal pressure of the battery rises abnormally.

When the battery can no longer tolerate the abnormal rise of the internal pressure, the battery case explodes and the contents fly out in all directions. Thus, the battery case is equipped with an explosion-proof valve for releasing internal pressure of the battery when the internal pressure exceeds a predetermined internal pressure thus preventing the explosion of the battery.

The explosion-proof valve is disclosed in for example, Japanese Laid-Open Patent Publication No. 10-261391 (Paragraphs 0017-0019, FIG. 3), Japanese Laid-Open Patent Publication No. 11-185714 (Paragraphs 0019, 0026, FIGS. 2-4), and Japanese Laid-Open Patent Publication No. 2001-143664 (Paragraphs 0019-0022, FIGS. 1-6). In such publications, a groove is formed on a lid and the like of the battery case, and when the internal pressure of the battery becomes equal to or greater than a predetermined value, a thin wall formed by the groove rips thus releasing the internal pressure of the battery. Another document, for example, Japanese Laid-Open Patent Publication No. 2001-256944 (Paragraphs 0021-0028, FIGS. 1-12) discloses an explosion-proof valve in which a circular or an elliptical thin part is formed on the lid of the battery and when the internal pressure of the battery becomes equal to or greater than the predetermined value, the thin part rips thus releasing the internal pressure of the battery.

With regards to the explosion-proof valve disclosed in Japanese Laid-Open Patent Publication No. 10-261391, Japanese Laid-Open Patent Publication No. 11-185714, and Japanese Laid-Open Patent Publication No. 2001-143664, when the battery case expands and deforms due to the abnormal rise of the internal pressure of the battery, the groove is pulled in the direction of the width of the groove and is ripped, and thus can not be sufficiently ripped unless the dimension of the entire length of the groove is long. Therefore, a large surface area is needed to form the groove, and is thus difficult to apply to a small battery.

In this case, when the wall thickness of the thin wall of the groove is thinned, the technique disclosed in Japanese Laid-Open Patent Publication No. 10-261391, Japanese Laid-Open Patent Publication No. 11-185714, and Japanese Laid-Open Patent Publication No. 2001-143664 is applicable even to a small battery, but if the wall thickness is too thinned, the groove may easily rip when the battery is accidentally dropped.

In Japanese Laid-Open Patent Publication No. 2001-256944, the explosion-proof valve can be formed small, but the thin part is formed by press working or cutting. Formation of the thin part by press working is difficult and in the formation by cutting, the manufacturing cost is expensive. Further, when a foreign object hits the thin part, the relevant part is easily ripped and thus handling of the battery in for example, manufacturing steps is troublesome.

SUMMARY OF THE INVENTION

The present invention focuses on the deformed state of the battery case when the internal pressure of the battery rises abnormally, and proposes a sealed battery that is manufactured small and at low cost, and is equipped with an explosion-proof valve having excellent reliability.

As shown in FIG. 1 and FIG. 3, the sealed battery of the present invention includes a square shaped battery case 1 which is long in the horizontal direction and an explosion-proof valve 2 arranged near a reference short side 6c of a installation surface wall 6a selected among the upper, lower, left and right side of the battery case 1. The explosion-proof valve 2 includes a V-shaped groove 15 concavely formed in V-shaped or U-shaped in which a central bent part 15a is positioned at a central location in the front-back direction of the installation surface wall 6a and expanding in the front-back direction, and a thin wall 16 formed by the V-shaped groove 15. A cut groove 18 connecting the front-back end of the V-shaped groove 15 and the long side 6d in the front-back direction of the installation surface wall 6a is cut and formed in the installation surface wall 6a.

More specifically, the battery case 1 includes a square tube shaped case body 5 with a bottom in which the upper surface opens, and a lid 6 closing the opened upper surface of the case body 5 in a sealing manner, and with the main surface wall of the lid 6 as the installation surface wall 6a, the explosion-proof valve 2 is provided on the installation surface wall 6a.

Further, the V-shaped groove 15 is comprised of concave grooves 17a, 17b concavely formed on the inner and outer side of the installation surface wall 6a, and the thin wall 16 is formed between the inner and outer concave grooves 17a, 17b. That is, the thin wall 16 is arranged in the middle in the thickness direction of the installation surface wall 6a.

When the thin wall 16 is too thin, the thin wall 16 is carelessly and easily ripped by the dropping impact, and when the thin wall 16 is too thick, the thin wall 16 does not exhibit the primary function, and thus the thickness of the thin wall 16 can be set to between 0.05 mm to 0.3 mm. The present invention utilizes expansion and deformation of the battery case 1 involved in the abnormal rise of the internal pressure of the battery, and thus the dimension L6 between the center in the width direction of the groove of the cut groove 18 and the reference short side 6c of the installation surface wall 6a is preferably set to between 3.0 mm to 6.7 mm.

When the internal pressure of the battery abnormally rises, the battery case 1 expands and deforms. Observing the behavior thereof with reference to the examples, the central part of the front and back walls having a large surface area of the case body 5 expands in the front-back direction, as shown in FIG.

4. Accompanied therewith, the lower wall and the left and right side walls of the case body 5 and the installation surface wall 6a of the lid 6 deform so that the central parts thereof curve inwardly. Focusing on the installation surface wall 6a of the lid 6, the end sides in the horizontal direction bend and deform so as to be lifted.

The cut groove 18 is arranged at the bending location near the end in the horizontal direction on the installation surface wall 6a of the lid 6. Therefore, when the battery case 1 expands and deforms to approximately the limit point, the cut groove 18 acts to promote the bending deformation. Simultaneously, with the installation surface wall 6a of the lid 6 as the boundary on the cut groove 18, the central side in the horizontal direction attempts to return to the flat state with the elastic restoration force. A tension force is applied in the inward-outward (up-down) direction to the thin wall 16 by the V-shaped groove 15. The dimension L6 between the center in the width direction of the groove of the cut groove 18 and the reference short side 6c of the installation surface wall 6a is preferably set to between 3.0 mm to 6.7 mm. This is because when the battery case 1 expands and deforms, as the difference in the slope angle of the left and right of the installation surface wall 6a of the lid 6 becomes greater with the cut groove 18 as the boundary, the thin wall 16 is more reliably ripped, and when the dimension L6 becomes smaller than 3.0 mm or becomes greater than 6.7 mm, the thin wall 16 is not easily ripped.

The thin wall 16 is ripped with the location of the central bend part 15a of the V-shaped groove 15 as the starting point, and the internal pressure of the battery is released from the rip.

According to the explosion-proof valve 2 of the present invention, when the battery case 1 expands and deforms with the abnormal rise of the internal pressure of the battery, a ripping force is intensively applied to the location corresponding to the central bent part 15a of the V-shaped groove 15 on the thin wall 16 formed with the V-shaped groove 15 through the cut groove 18. Therefore, even when subjected to the dropping impact, the thin wall 16 is prevented from being carelessly ripped, and during the abnormal rise of the internal pressure of the battery, the explosion-proof valve 2 is effectively and reliably operated.

The thin wall 16 of the explosion-proof valve 2 of the present invention can be ripped using the bending deformation of the installation surface wall 6a of the lid 6 even if the thickness dimension is set relatively large so as not to be carelessly ripped open, and thus the manufacturing management and the like is facilitated and can be manufactured at low cost, and the explosion-proof valve 2 itself can be made compact.

BRIEF DESCRIPTION OF THE DRAWINGS

FIG. 3A is a plan view:
FIG. 3B is a bottom view;
FIG. 3C is a cross sectional view taken along line A-A of FIG. 3B;
FIG. 3D is a cross sectional view taken along line B-B of FIG. 3B.

DETAILED DESCRIPTION OF THE PREFERRED EMBODIMENTS

Example 1

Figure 1:
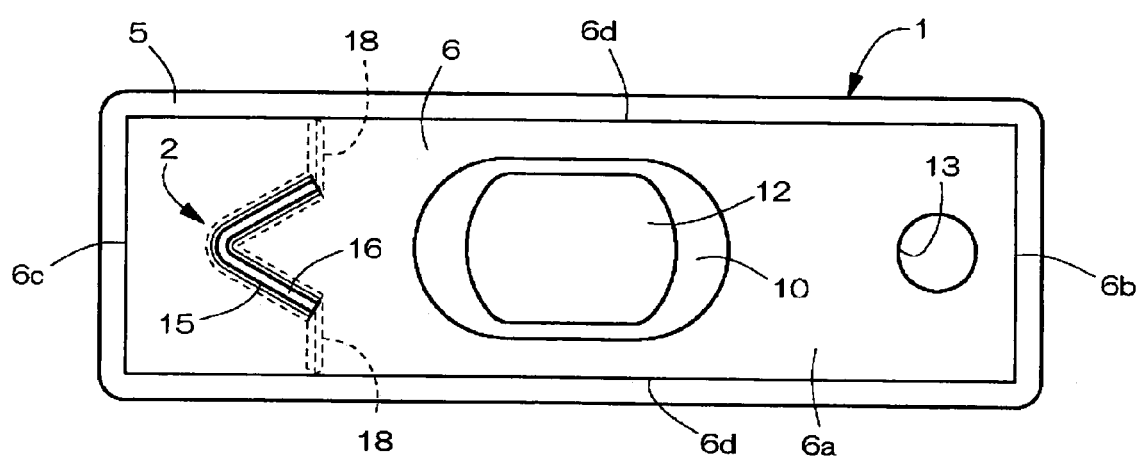
FIG. 1 is a plan view of a lid of a battery case of example 1.
Figure 2:
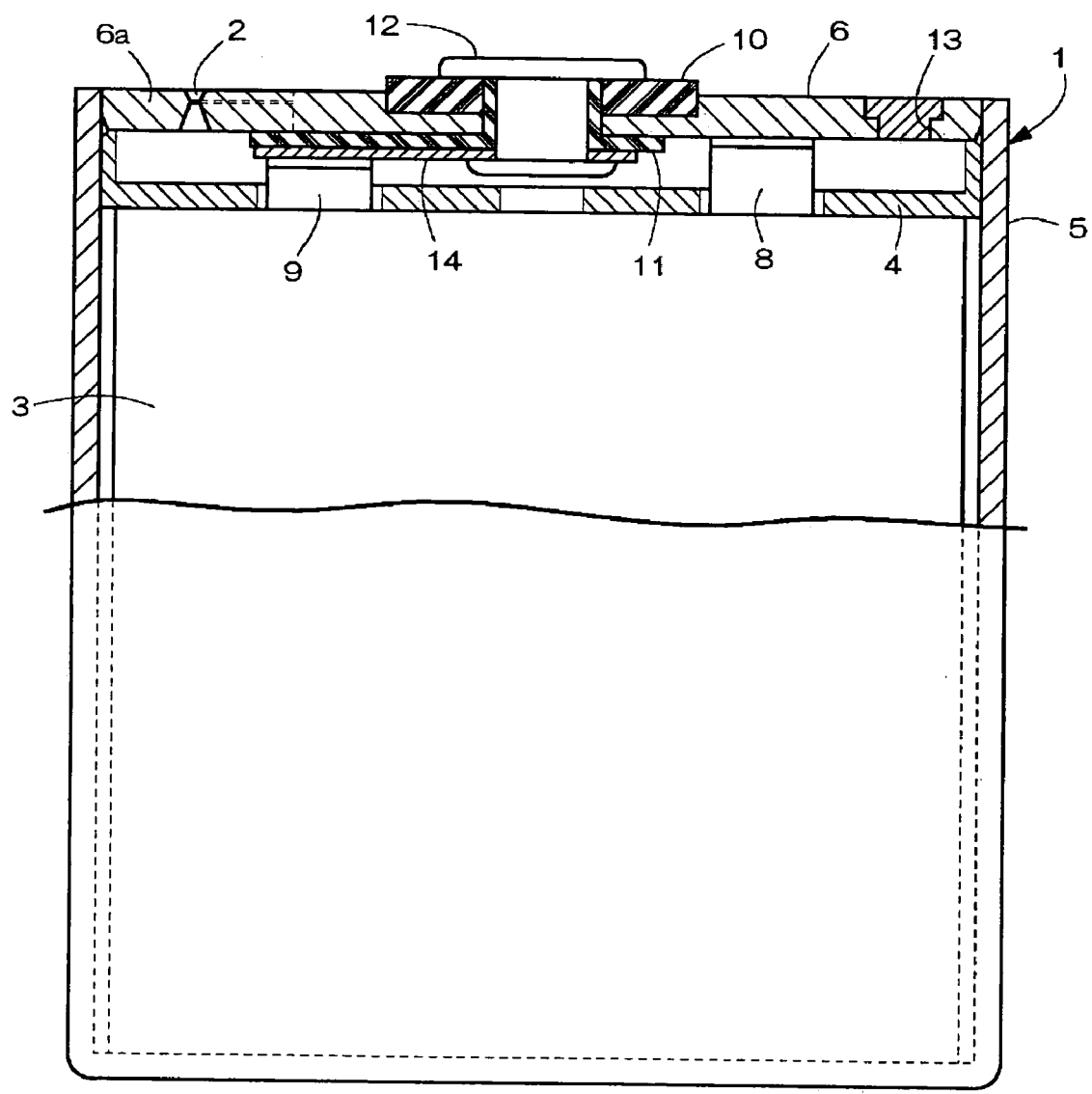
FIG. 2 is a longitudinal front view of a battery.

FIGS. 1 to 3 show a lithium ion secondary battery as an example 1 of a sealed rectangular battery according to the present invention, and as shown in FIG. 1 and FIG. 2, an explosion-proof valve 2 that fractures when the internal pressure of the battery rises abnormally and releases the internal pressure of the battery is arranged in a square-shaped thin battery case 1 which is long in the horizontal direction, or having width dimension in the front-back direction smaller than the height dimension in the vertical direction and the length dimension in the horizontal direction.

An electrode body 3 and a nonaqueous electrolytic solution are sealed and accommodated in the battery case 1, and an insulator 4 made of plastic is arranged on an upper end in the battery case 1. Here, the length dimension in the horizontal direction of the battery case 1 is 34 mm, the width dimension in the front-back direction is 5 mm, and the height dimension in the vertical direction is 45 mm.

The battery case 1 includes a square tube shaped case body 5 with a bottom including an upper surface that opens, and a lid 6, long in the horizontal direction, for closing the opened upper surface of the case body 5 in a sealed manner. In the example 1 of the present invention, a main surface wall of the lid 6 is selected to be an installation surface wall 6a, and the explosion-proof valve 2 is press molded in the installation surface wall 6a. The case body 5 is formed by deep drawing for example, a stainless steel plate.

With regards to the electrode body 3, electrodes of a sheet of positive and negative electrodes are spirally wounded with a separator in between, and subsequently, is squashed as a whole and deformed into a flat shape having a square cross section corresponding to the cross sectional shape of the battery case 1. A cathode and an anode collector lead 8, 9 each leads out upwardly from each electrode of the positive electrode and the negative electrode of the electrode body 3. The cathode collector lead 8 is made of aluminum and the anode collector lead 9 is made of nickel.

The lid 6 is a press molded component of a metal plate having electrical conductivity such as aluminum alloy, and an outer peripheral edge of the installation surface wall 6a is seal welded to a peripheral edge of the opened upper end of the case body 5 with a laser. An anode terminal 12 is passed through and attached to the center of the installation surface wall 6a of the lid 6 through an upper and lower insulating packing 10, 11. The thickness dimension of the installation surface wall 6a of the lid 6 is 0.8 mm.

An injection hole 13 is formed in the vicinity of one side, on the left or the right, of the lid 6 or on a right short side 6b in the figure, and the electrolytic solution is injected into the battery case 1 through the injection hole 13. The injection hole 13 is sealed after the electrolytic solution is injected. A lead body 14 made of a rectangular thin plate, long in the horizontal direction, is connected to a lower end of the anode terminal 12. The lead body 14 is extended towards the left side, opposite the side of the injection hole 13, and is insulated from the lid 6 by the lower insulating packing 11. The anode collector lead 9 is laser welded to a lower surface of the lead body 14.

The cathode collector lead 8 is spot welded to an inner surface of the lid 6 at between the insulating packing 11 and the injection hole 13. Thus, the cathode collector lead 8 is conducted to the current case 1 and the battery case 1 also acts as a cathode terminal.

As shown in FIG. 1, having the left short side 6c of the lid 6 as a reference short side, the explosion-proof valve 2 is arranged on the installation surface wall 6a near the reference short side 6c, and includes a V-shaped groove 15 and a thin wall 16 formed by the V-shaped groove 15, as shown in FIGS. 3A to 3C, the V-shaped groove 15 being concavely formed in a V-shape in a plan view in which a central bent part 15a is positioned at a location in the front-back direction of the installation surface wall 6a and expanding in the front-back direction, and The V-shaped groove 15 includes concave grooves 17a, 17b concavely formed on an inner and outer surface of the installation surface wall 6a so as to face each other, and the central bent part 15a is faced towards the reference short side 6c. That is, the thin wall 16 is formed between the inner and outer concave grooves 17a, 17b at the middle in the thickness direction of the installation surface wall 6a.

The thin wall 16 is set so that the thickness dimension L1 is 0.06 mm, and the width dimension L2 is 0.2 mm. The dimension L3 between the reference short side 6c of the lid 6 and the middle of the central bent part 15a of the V-shaped groove 15 in the width direction of the groove is set to be 1.9 mm. The length dimension L4 in the horizontal direction of the V-shaped groove 15 is 1.7 mm, and the maximum dimension L5 in the front-back direction between the ends on the right of the V-shaped groove 15 is set to be 24 mm.

As shown in FIG. 3C, the inner and outer concave groove 17a, 17b each have a trapezoidal cross section in which the width dimension of the groove is narrower on the thin wall 16 side, and the depth dimension of the inner concave groove 17a is greater than that of the outer concave groove 17b. The inner concave groove 17a is set so that the depth dimension is 0.54 m, and the width dimension of the groove at the opened lower surface is 0.6 mm. The outer concave groove 17b is set so that the depth dimension is 0.2 mm, and the width dimension of the groove at the opened lower surface is 0.4 mm.

As shown in FIG. 3B, a front-back pair of V-shaped cut grooves 18, 18 connecting the front and back ends on the right end of the inner concave groove 17a and the long sides 6d, 6d in the front-back direction of the installation surface wall 6a are cut and formed on the inner surface of the installation surface wall 6a of the lid 6. Each cut groove 18 is orthogonal to the long side 6d. The depth dimension of the cut groove is set to be 0.3 mm. The dimension L6 between the reference short side 6c of the lid 6 and the cut groove 18 is set to be approximately 3.6 mm. The cut grooves 18, 18 are preferably orthogonal to the long sides 6d, 6d in the front-back direction of the installation surface wall 6a, as stated above, but may also be extended diagonally from the V-shaped groove 15 towards the long sides 6d, 6d.

Lithium composite oxide such as $LiCoO_2$, $LiMn_2O_4$, and $LiNiO_2$ having an open circuit voltage lithium reference) during charge of equal to or greater than 4 V, an oxide in which one part of Co, Mn, Ni of the above lithium composite oxide is substituted with other elements such as Ge, Ti, Ta, Nb, Yb, or metal oxide such as manganese oxide, vanadium pentoxide, and chromic acid are used for the material of the positive electrode of the electrode body 3.

When Ge, Ti, Ta, Nb, Yb are contained as a substitutional element, the content thereof is preferably at least equal to or greater than 0.001 atomic percent, and more preferably equal to or greater than 0.003 atomic percent. The content is preferably equal to or less than 3 atomic percent at the most, and is more preferably equal to or less than 1 atomic percent.

A carbon material such as black lead, pyrolytic carbon type, coke type, glass carbon type, burning body of organic high molecular weight compound, mesocarbon microbeads, carbon fiber, activated carbon, graphite and carbon colloid, a metal oxide capable of including L1 such as $SnO_x$ and $SiO_x$ and a metal nitrogen are used for the material of the negative electrode of the electrode body 3.

Micro porous film made of polyolefin such as polyethylene and polypropylene, and nonwoven cloth made of polyethylene, polybutylene terephthalate or cellulose are used for the separator. The outer peripheral surface of the negative electrode of the electrode body 3 is coated with the separator.

The positive electrode of the electrode body 3 is prepared in the following way. The $LiCoO_2$ (cathode active material), an acetylene black serving as conductive aid, and poly(vinylidene fluoride) serving as a binder are mixed at a proportion of weight ratio of 92:4:4, and N-methyl-2-pyrrolidone serving as a solvent is mixed with the above mixture, thus preparing a cathode mixture slurry.

Subsequently, the cathode mixture slurry is filtered with a filter to remove those with a relatively large particle diameter, and is then evenly applied on both sides of the strip-shaped cathode collector material made of aluminum foil having a thickness dimension of 15 μm and is then dried. After compression molding with a roller press machine, the resultant is cut to a predetermined size. The positive electrode is not applied with the cathode mixture slurry at the part to be the end part at the finish of winding, and the cathode collector lead 8 is welded to the relevant part in the same direction as the length direction of the positive electrode.

The negative electrode of the electrode body 3 is prepared in the following way. The black lead carbon material (anode active material) and poly(vinylidene fluoride) serving as a binder are mixed at a proportion of a weight ratio of 92:8, and N-methylpyrrolidone serving as a solvent is mixed to the above mixture, thus preparing an anode mixture slurry.

Subsequently, the anode mixture slurry is filtered with a filter to remove those with a relatively large particle diameter, and is evenly applied on both sides of the strip-shaped anode collector material made of copper foil having a thickness dimension of 10 μm and is then dried. After calendaring (process) with a roller pressing machine, the resultant is cut into a predetermined size and dried, and the anode collector lead 9 is welded thereto.

The negative electrode, similar to the positive electrode, is not applied with the anode mixture slurry at the part to be the end part at the finish of winding, and the anode collector lead 9 is welded to the relevant part in the same direction as the length direction of the negative electrode. The part not facing the positive electrode in the wounded state is not applied with the anode mixture slurry in the negative electrode.

The positive electrode and the negative electrode prepared in the above manner is sandwiched with the separator made of micro porous polyethylene film of thickness dimension of 20 μm, and after being wounded to an elliptical cross section, and squashed and deformed to a flat shape, is taped. The electrode body 2 is thereby formed.

$LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(Rf_2)(RfSO_2)$, $LiN(RfOSO_2)_2$, $LiC(RfSO_2)_3$, $LiC_nF_{2n+1}SO_3(n \geq 2)$, $LiN(RfOSO_2)_2$ [Rf is fluoroalkyl group] and polymer imide lithium salt and the like, or a mixture of two of the above are used as an electrolyte of the nonaqueous electrolytic solution. When such electrolyte is taken into the coating of the surface of the electrode, the coating is given satisfactory ion conductivity. $LiPF_6$ has high ion conductivity and is thus particularly preferable as the electrolyte.

Chain ester such as dimethyl carbonate, diethyl carbonate, methyl ethyl carbonate, methyl propionate, chain trialkylester phosphate such as trimethyl phosphate, 1,2-dimetoxyethane, 1,3-dioxolane, tetrahydrofuran, 2-methyl-tetrahydrofuran and diethyl ether are used as the nonaqueous solvent (organic solvent) of the nonaqueous electrolytic solution.

Nitrogen containing organic solvent such as amine or imide and sulfur type organic solvent such as sulfolane may also be used as the nonaqueous solvent, but most preferably, chain carbonates such as dimethyl carbonate, diethyl carbonate, methyl ethyl carbonate are used.

The quantity of the nonaqueous solvent is preferably less than 90 percent by volume of the entire solvent of the electrolytic solution and more preferably equal to or less than 80 percent by volume, and further, in terms of load characteristic, is preferably equal to or greater than 40 percent by volume, more preferably equal to or greater than 50 percent by volume and most preferably equal to or greater than 60 percent by volume.

Other solvent component includes preferably mixing and using ester (dielectric constant of equal to or greater than 30) having high dielectric constant, and sulfur type ester such as ethylene glycol sulphite is mixed and used along with ethylene carbonate, propylene carbonate, butylene carbonate or gamma butyrolactone. The solvent component preferably has a cyclic structure, and cyclic carbonate such as ethylene carbonate is particularly preferable.

The quantity of ester having high dielectric constant is preferably less than 80 percent by volume with respect to the entire solvent of the electrolytic solution, more preferably equal to or less than 50 percent by volume, most preferably equal to or less than 35 percent by volume, and in terms of load characteristic, is preferably equal to or greater than 1 percent by volume, more preferably equal to or greater than 10 percent by volume, and most preferably equal to or greater than 25 percent by volume.

In the electrolytic solution, a compound including $-SO_2-$ bond, especially, a solvent including $-O-SO_2-$ bond is preferably dissolved. With regards to the solvent including $-O-SO_2-$ bond, 1,3-propansultone, methyl ethyl sulfonate and diethyl sulfonate and the like is selected. The content thereof is preferably equal to or greater than 0.5 percent by weight, more preferably equal to or greater than 1 percent by weight, and further, is preferably equal to or less than 10 percent by weight, and more preferably equal to or less than 5 percent by weight in the electrolytic solution.

Polymer component such as polyethylene oxide and poly (methyl methacrylate) may be included in the nonaqueous electrolytic solution, and a gel electrolyte may be used.

A concentration of the electrolyte in the electrolytic solution is preferably equal to or greater than 1 mol/L as such concentration provides better safety, more preferably equal to or greater than 1.2 mol/L, and further, is preferably less than 1.7 mol/L as such concentration provides better load characteristic, and more preferably less than 1.5 mol/L.

The electrolytic solution is prepared in the following way. A mixed solvent having a volume ratio of 1:2 of ethylene carbonate and methyl ethyl carbonate is prepared, and $LiPF_6$ of concentration of 1.2 mol/L is dissolved in the mixed solvent, and subsequently, cyclohexylbenzene and 1,3-propansultone and the like is added thereto so as to have the respective content of 2 percent by weight.

The battery is prepared in the following way. As stated above, the anode terminal 12, the upper and lower insulating packing 10, 11 and the lead body 14 are attached to the lid 6, and the electrode body 3 is housed in the case body 5.

Subsequently, the anode collector lead 9 is welded to the lead body 14, and the cathode collector lead 8 is welded to the lid 6 in the above mentioned way (state of FIG. 1). After seal welding the lid 6 to the peripheral edge of the opening of the case body 5 with laser, the electrolytic solution is injected through the injection hole 13, which injection hole 13 is then sealed (state of FIG. 2), and the battery of the present invention is then completed.

Figure 4:
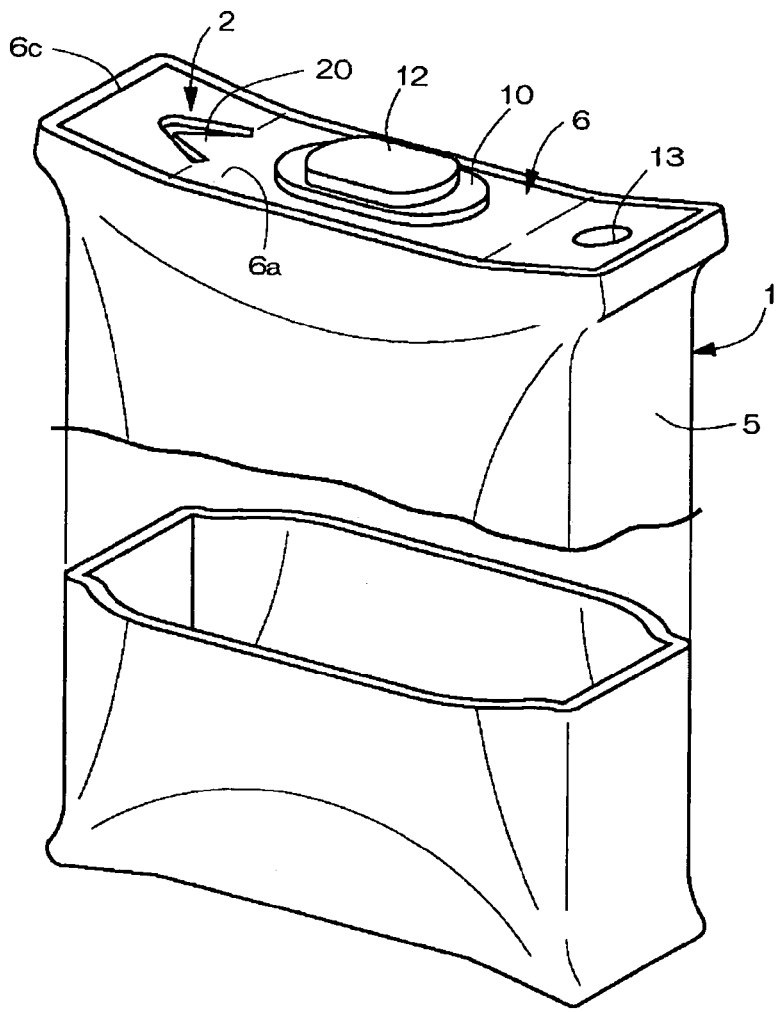
FIG. 4 is a perspective view explaining an expanded state of the battery.

When the internal pressure of the battery rises abnormally, the battery case 1 expands and deforms. More specifically, as shown in FIG. 4, the central part of the front and back walls of the case body 5 is expanded outwardly, and the left and right side walls and the lower wall of the case body 5 as well as the installation surface wall 6a of the lid 6 all have the central part thereof concavely deformed in a curved-shape.

Figure 5:
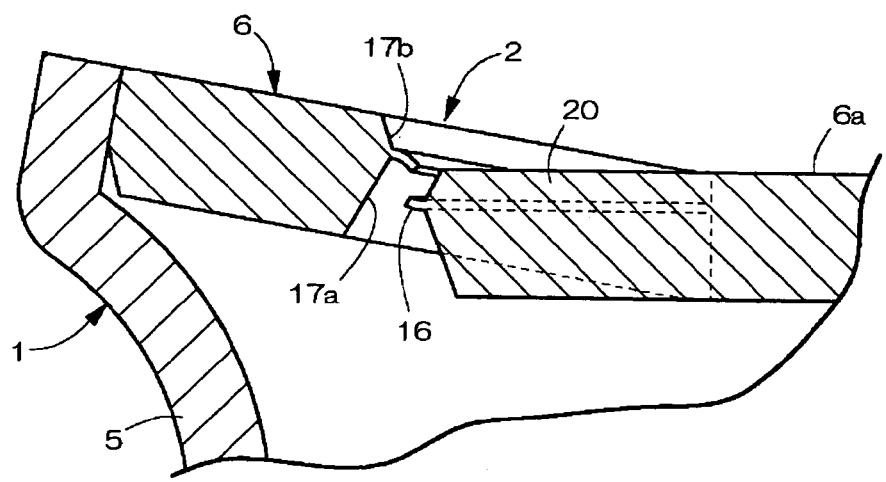
FIG. 5 is a longitudinal front view of a main part with the explosion-proof valve in an operated state.

When the internal pressure of the battery exceeds the predetermined value and abnormally rises, the installation surface wall 6a of the lid 6 is bent at the cut groove 18 so that the reference short side 6b is lifted with respect to the central part. Here, as shown in FIG. 4 and FIG. 5, the central side in the horizontal direction of the installation surface wall 6a attempts to return to a flat state with an elastic restoration force. Therefore, a triangular tongue portion 20 defined by the V-shaped groove 15 and arranged at the central side in the horizontal direction of the installation surface wall 6a is not lifted and is in a remained state and acts to pull the thin wall 16 inwardly.

Since the tensile force of the thin wall 16 in the downward direction is great at sections of the central bent part 15a of the V-shaped groove 15, and a section of the thin wall 16 corresponding to the central bent part 15a is the danger cross section, the thin wall 16 is ripped from the section corresponding to the relevant central bent part 15a, and the internal pressure of the battery is released from the rip. It is to be noted that the thin wall 16 is subjected to tensile force not only in the horizontal direction, but also in the inward and outward thickness direction.

Example 2

Figure 6:
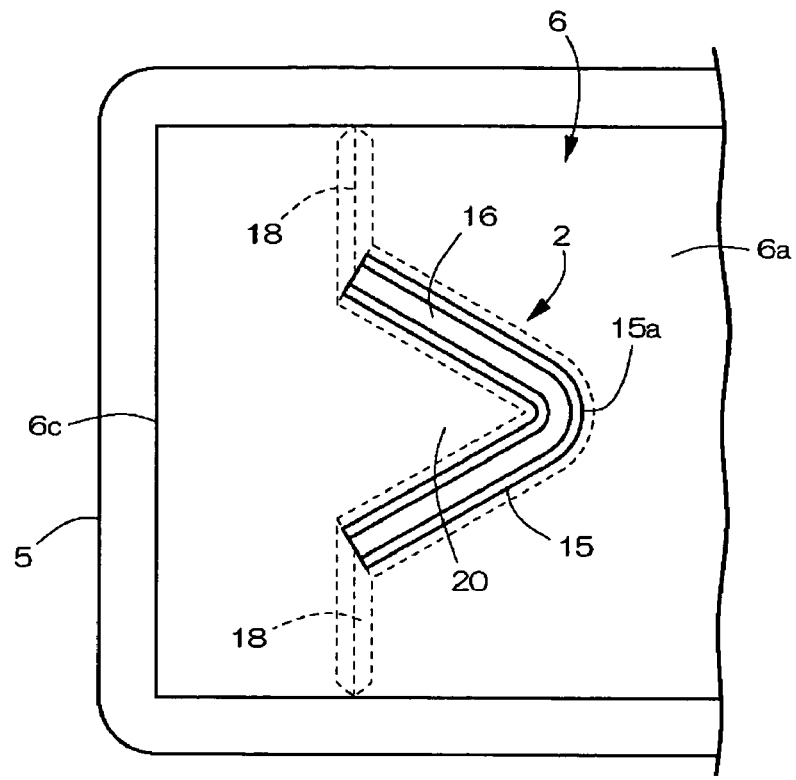
FIG. 6 is a plan view of a main part of example 2.

FIG. 6 shows an example 2 of a sealed rectangular battery, the subject matter of the present invention, and the V-shaped groove 15 of the explosion-proof valve 2 is formed in V-shaped in which the central bent part 15a is faced towards the right on the center side, opposite to that in example 1, and is opened in the front-back direction. Other features are the same as example 1 and thus like reference characters designate corresponding parts and the explanation thereof is omitted.

Figure 7:
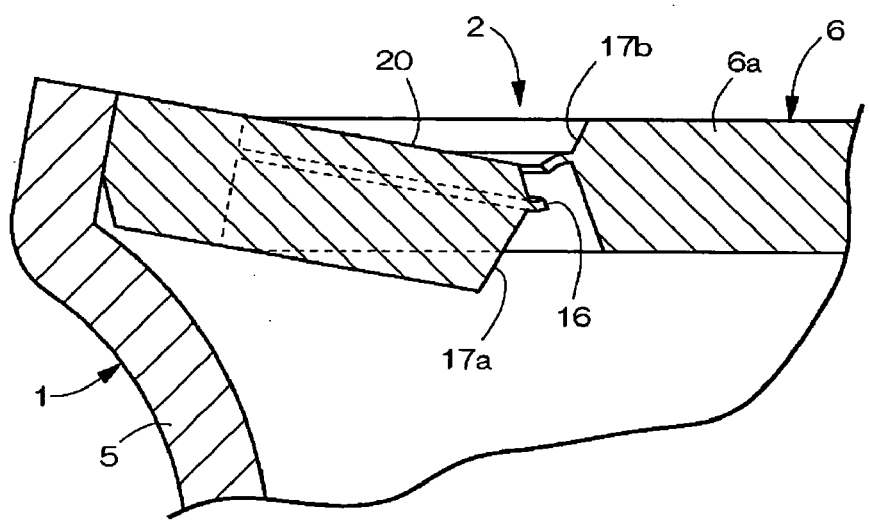
FIG. 7 is a longitudinal front view of a main part with the explosion-proof valve of example 2 in the operated state.

As shown in FIG. 7, in the explosion-proof valve 2 of example 2, when the reference short side 6c of the installation surface wall 6a of the lid 6 is lifted at the cut groove 18, the tongue portion 20 facing towards the central side is moved inwardly, and thus the thin wall 16 is ripped at the section corresponding to the central bent part 15a of the V-shaped groove 15, and the pressure within the battery case 1 is released from the rip.

Example 3

In example 3, the lower wall of the battery case 1 is selected as the installation surface wall 6a, and other features are the same as example 1 except that the explosion-proof valve 2 is provided near the reference short side on the left side of the installation surface wall 6a.

Example 4

In example 4, the lower wall of the battery case 1 is selected as the installation surface wall 6a, and other features are the same as example 1 except that the explosion-proof valve 2 is provided near the reference short side on the left side of the installation surface wall 6a, and the central bent part 15a of the V-shaped groove 15 is faced towards the right on the center side as in example 2.

Example 5

Figure 8:
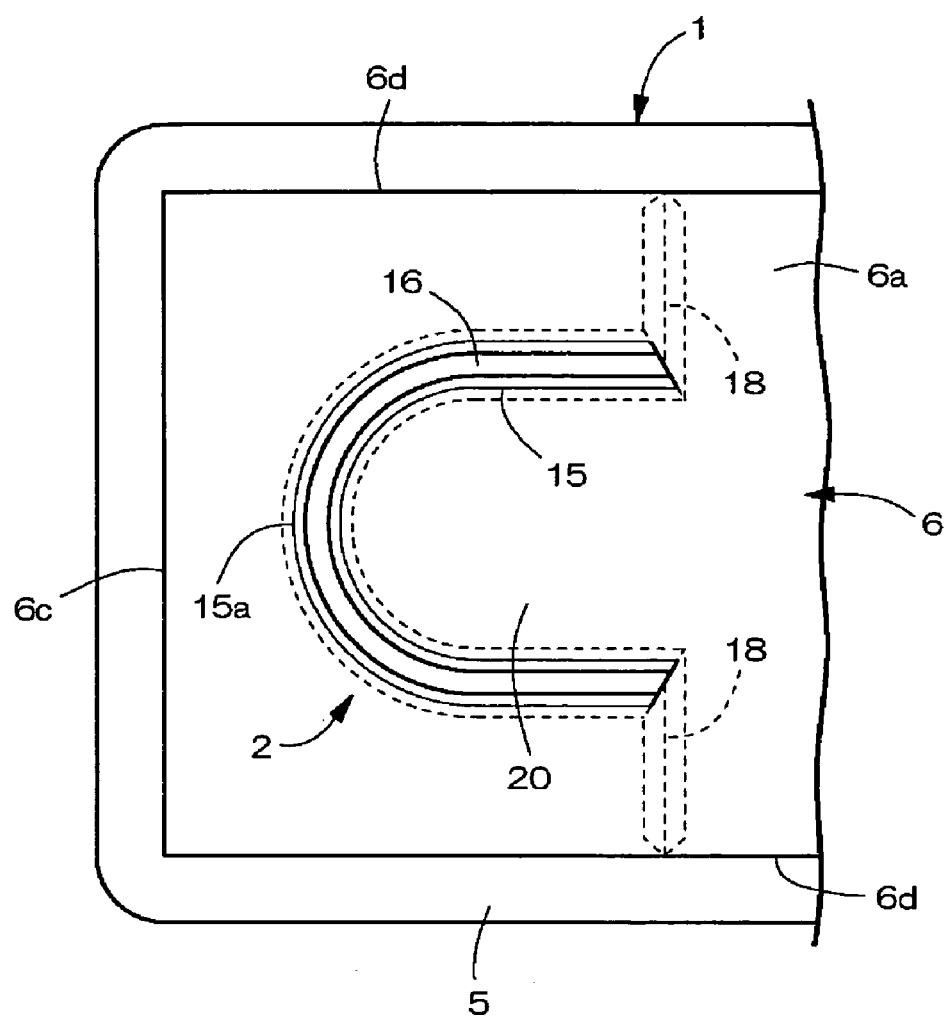
FIG. 8 is a plan view of the explosion-proof valve of example 5.

FIG. 8 shows example 5 of a sealed rectangular battery according to the present invention, and other features are the same as example 1, where the only difference with example 1 is that the V-shaped groove 15 of the explosion-proof valve 2 is formed in U-shaped in plan view.

Comparative Example 1

In comparative example 1, a releasing hole is provided in the lid 6 of the battery case 1 as an explosion-proof valve, and a thin valve body of thickness of 0.04 mm is arranged so as to block the releasing hole. Other aspects are the same as example 1.

Comparative Example 2

In comparative example 2, regarding the explosion-proof valve 2, the thickness dimension of the thin wall 16 defined by the V-shaped groove 15 is 0.35 mm and other aspects are the same as example 1.

Comparative Example 3

In comparative example 3, the cut groove 18 is omitted in the explosion-proof valve 2, and other aspects are the same as example 1.

Comparative Example 4

In comparative example 4, the dimension L6 between the reference short side 6c on the left side of the lid 6 and the center in the width direction of the groove of the cut groove 18 is set to 1.0 mm, and other aspects are the same as example 1.

Ten of each of the batteries according to examples 1 to 5 of the present invention and the batteries of comparative examples 1 to 4 were prepared and the heating test and the dropping test were performed. Table 1 shows the result thereof. In the heating test, charge was carried out for an hour with a constant current of 700 mA to have the battery voltage to 4.2 V, and subsequently, was heated at 150° C. and the presence of explosion of the battery at sections other than where the explosion-proof valve is located was checked. In the dropping test, the battery was dropped from a height of 1.5 m, and the presence of liquid leakage of the electrolytic solution was checked.

TABLE 1

| | Number of explosions of battery held at 150° C. (number) | Number of liquid leakage during dropping test (number) |
|---|---|---|
| Example 1 | 0 | 0 |
| Example 2 | 0 | 0 |
| Example 3 | 0 | 0 |
| Example 4 | 0 | 0 |
| Example 5 | 0 | 0 |
| Comparative Example 1 | 1 | 5 |
| Comparative Example 2 | 4 | 0 |
| Comparative Example 3 | 3 | 1 |
| Comparative Example 4 | 4 | 0 |

In the above mentioned heating test, the battery case 1 was deformed as shown in FIG. 4 in all the batteries, but the rip was formed at the thin wall 16 of the explosion-proof valve 2 and explosion of the battery was not recognized in the batteries of examples 1 to 5. Further, in the batteries of examples 1 to 5, liquid leakage of the electrolytic solution was not recognized in the dropping test in any of the batteries.

On the contrary, in comparative example 1, an explosion occurred in one battery in the heating test, and in the dropping test, the thin surface was ripped and the electrolytic solution leaked out in half or five of the batteries. In comparative examples 2 and 4, explosion occurred in four batteries in the heating test. In comparative example 3, explosion occurred in three batteries in the heating test, and the electrolytic solution leaked out in one battery in the dropping test. In comparative examples 2 and 4, the electrolytic solution did not leak out in any of the batteries in the dropping test.

The comparative example 1 is considered to be weak to dropping impact since the valve body has a thickness of 0.04 mm or is thin. In comparative example 2, it is thought that the explosion occurred in the battery due to the fact that the thin wall 16 of the explosion-proof valve 2 was thick and was hard to rip. Many explosions occurred in the batteries of comparative example 3 because the lid 6 was hard to bend at the location where the explosion-proof valve 2 was present since the cut groove 18 was not present and thus the thin wall 16 was hard to rip.

Many explosions were recognized in the batteries of comparative example 4 because the explosion-proof valve 2 was too close to the reference short side 6c of the lid 6 and the reference short side 6c of the lid 6 could not be sufficiently lifted and deformed at the cut groove 18, and thus the thin wall 16 of the explosion-proof valve 2 was difficult to rip even if the battery was expanded.

Even if the V-shaped groove 15 of the explosion-proof valve 2 was formed in U-shaped opened on the right side, opposite to example 5, explosion did not occur in the batteries in the heating test similar to example 5 and the liquid leakage of the electrolytic solution was not recognized in the dropping test. Even if the explosion-proof valve 2 was arranged near the upper or the lower short side on one side wall on the right or left of the battery case 1, a similar effect as with examples 1 and 2 were obtained.

Taking into account the production efficiency of the battery, the effective utilization of the internal volume of the battery case 1, simplicity of connection between the cathode and anode collector leads 8, 9 and the positive and negative electrodes, the electrode body 3 preferably has a configuration in which the above mentioned positive electrode, the separator, and the negative electrode are superimposed and wounded, but having a stacked body including the positive electrode, the separator, and the negative electrode as one unit, the electrode body 3 may also have a configuration in which a plurality of stacked bodies are stacked one over the other, and may also have a configuration in which a strip-shaped stacked body where the positive electrode, the separator, and the negative electrode are superimposed is stacked in a folded manner.

The V-shaped groove 15 in the explosion-proof valve 2 of the present invention may be formed on one surface only of the inside or outside of the installation surface wall 6*a*.

What is claimed is:

1. A sealed rectangular battery, comprising:
a rectangular shaped battery case whose cross-section is oblong, said battery case comprising a rectangular shaped case body with a bottom and a lid closing an opened upper surface of the case body in a sealing manner; and an explosion-proof valve arranged near one of two opposing short sides of a main surface wall of the lid; wherein the explosion-proof valve consists of a V-cut groove concavely formed in a V-shape or U-shape in which a central bent part is positioned at a central location in the main surface wall of the lid, and a thin wall formed by the V-cut groove, and wherein cut grooves connecting each of two ends of the V-cut groove and each of two long sides of the main surface wall of the lid which are parallel to each other, respectively, are cut and formed in an inner side of the main surface wall of the lid.

2. The sealed rectangular battery according to claim 1, wherein the thickness of the thin wall is set to between 0.05 mm to 0.3 mm.

3. The sealed rectangular battery according to claim 1, wherein the dimension between a centerline of the groove of the cut groove extending along the groove and the one of two opposing short sides of the main surface wall of the lid is set to between 3.0 mm to 6.7 mm.

* * * * *